United States Patent
Smyers

(10) Patent No.: US 7,124,292 B2
(45) Date of Patent: *Oct. 17, 2006

(54) AUTOMATICALLY CONFIGURING STORAGE ARRAY INCLUDING A PLURALITY OF MEDIA STORAGE DEVICES FOR STORING AND PROVIDING DATA WITHIN A NETWORK OF DEVICES

(75) Inventor: Scott D. Smyers, San Jose, CA (US)

(73) Assignees: Sony Corporation, Tokyo (JP); Sony Electronics INC, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/189,626

(22) Filed: Jul. 25, 2005

(65) Prior Publication Data

US 2005/0259536 A1    Nov. 24, 2005

Related U.S. Application Data

(62) Division of application No. 09/861,825, filed on May 21, 2001, now Pat. No. 6,993,646.

(51) Int. Cl.
*G06F 11/00*  (2006.01)
*G06F 13/00*  (2006.01)

(52) U.S. Cl. ............ 713/2; 710/5; 710/8; 710/10; 711/114; 711/116; 711/132

(58) Field of Classification Search .............. 713/2; 710/5, 8, 10; 711/114, 116, 132
See application file for complete search history.

(56) References Cited

U.S. PATENT DOCUMENTS 3,836,722 A    9/1974    Muller et al. ............ 179/15 BS (Continued)

FOREIGN PATENT DOCUMENTS

EP    0 383 437 A2    2/1989

(Continued)

OTHER PUBLICATIONS

"The Parallel Protocol Engine" Matthias Kaiserswerth, IEEE/ACM Transactions on Networking, Dec. 1993, New York, pp. 650-663.
"The Programmable Protocol VLSI Engine (PROVE)" A.S. Krishnakumar, W.C. Fischer, and Krishan Sabnani, IEEE Transactions on Communications, Aug. 1994, New York, pp. 2630-2642.

(Continued)

*Primary Examiner*—A. Elamin
(74) *Attorney, Agent, or Firm*—Haverstock & Owens LLP

(57) ABSTRACT

An automatically configuring storage array includes a plurality of media storage devices coupled together within a network of devices. Preferably, the network of devices is an IEEE 1394-1995 serial bus network of devices. The media storage devices are utilized to record and retrieve streams of data transmitted within the network of devices. The media storage devices communicate with each other in order to store and retrieve streams of data over multiple media storage devices, if necessary. When a record or playback command is received by any one of the media storage devices, the media storage devices send control communications between themselves to ensure that the stream of data is recorded or transmitted, as appropriate. Control of the record or transmit operation is also transferred between the media storage devices in order to utilize the full capacity of the available media storage devices. Preferably, streams of data are recorded utilizing redundancy techniques. Object descriptors are stored within recorded streams of data to facilitate search and retrieval of the recorded streams of data throughout the media storage devices. Preferably, the media storage devices accept control instructions directly from devices within the network. Alternatively, a control device is utilized to provide a control interface between the media storage devices and the other devices within the network.

25 Claims, 4 Drawing Sheets

U.S. PATENT DOCUMENTS

| | | | |
|---|---|---|---|
| 3,906,484 A | 9/1975 | Melvin, Jr. et al. | 340/347 DD |
| 4,218,756 A | 8/1980 | Fraser | 364/900 |
| 4,298,932 A | 11/1981 | Sams | 364/200 |
| 4,409,656 A | 10/1983 | Anderson et al. | 364/200 |
| 4,410,983 A | 10/1983 | Cope | 371/8 |
| 4,493,021 A | 1/1985 | Agrawal et al. | 364/200 |
| 4,897,783 A | 1/1990 | Nay | 364/200 |
| 4,972,470 A | 11/1990 | Farago | 380/3 |
| 4,998,245 A | 3/1991 | Tanaka et al. | 370/85.1 |
| 5,007,013 A | 4/1991 | Elms | 364/900 |
| 5,008,819 A | 4/1991 | Gorbatenko | 364/200 |
| 5,008,879 A | 4/1991 | Fischer et al. | 370/85.2 |
| 5,052,029 A | 9/1991 | James et al. | 375/107 |
| 5,191,418 A | 3/1993 | Tran | 358/142 |
| 5,208,807 A | 5/1993 | Gass et al. | 370/60.1 |
| 5,287,478 A | 2/1994 | Johnston et al. | 395/425 |
| 5,331,320 A | 7/1994 | Cideciyan et al. | 341/56 |
| 5,359,713 A | 10/1994 | Moran et al. | 395/200 |
| 5,361,261 A | 11/1994 | Edem et al. | 370/85.3 |
| 5,369,773 A | 11/1994 | Hammerstrom | 395/800 |
| 5,400,340 A | 3/1995 | Hillman et al. | 370/105.3 |
| 5,402,419 A | 3/1995 | Osakabe et al. | 370/85.1 |
| 5,412,698 A | 5/1995 | Van Brunt et al. | 375/373 |
| 5,420,985 A | 5/1995 | Cantrell et al. | 395/325 |
| 5,432,650 A | 7/1995 | Nunomura et al. | 360/27 |
| 5,465,402 A | 11/1995 | Ono et al. | 455/161.2 |
| 5,473,362 A | 12/1995 | Fitzgerald et al. | 348/7 |
| 5,493,570 A | 2/1996 | Hillman et al. | 370/105.3 |
| 5,499,344 A | 3/1996 | Elnashar et al. | 395/250 |
| 5,506,846 A | 4/1996 | Edem et al. | 370/94.2 |
| 5,509,126 A | 4/1996 | Oprescu et al. | 395/307 |
| 5,519,701 A | 5/1996 | Colmant et al. | 370/60.1 |
| 5,524,213 A | 6/1996 | Dais et al. | 395/200.17 |
| 5,526,353 A | 6/1996 | Henley et al. | 370/60.1 |
| 5,533,018 A | 7/1996 | DeJager et al. | 370/60.1 |
| 5,535,208 A | 7/1996 | Kawakami et al. | 370/84 |
| 5,537,408 A | 7/1996 | Branstad et al. | 370/79 |
| 5,544,324 A | 8/1996 | Edem et al. | 395/200.17 |
| 5,548,587 A | 8/1996 | Bailey et al. | 370/60.1 |
| 5,550,802 A | 8/1996 | Worsley et al. | 370/13 |
| 5,559,796 A | 9/1996 | Edem et al. | 370/60 |
| 5,559,967 A | 9/1996 | Oprescu et al. | 395/285 |
| 5,561,427 A | 10/1996 | Coleman, Jr. | 341/161 |
| 5,566,174 A | 10/1996 | Sato et al. | 370/84 |
| 5,579,278 A | 11/1996 | McLaury | 365/230.05 |
| 5,586,264 A | 12/1996 | Belknap et al. | 395/200.08 |
| 5,594,732 A | 1/1997 | Bell et al. | 370/401 |
| 5,594,734 A | 1/1997 | Worsley et al. | 370/395 |
| 5,602,853 A | 2/1997 | Ben-Michael et al. | 370/474 |
| 5,603,058 A | 2/1997 | Belknap et al. | 395/855 |
| 5,615,382 A | 3/1997 | Gavin et al. | 395/800 |
| 5,617,419 A | 4/1997 | Christensen et al. | 370/471 |
| 5,619,646 A | 4/1997 | Hoch et al. | 395/200.01 |
| 5,632,016 A | 5/1997 | Hoch et al. | 395/200.02 |
| 5,640,286 A | 6/1997 | Acosta et al. | 360/48 |
| 5,640,392 A | 6/1997 | Hayashi | 370/392 |
| 5,640,592 A | 6/1997 | Rao | 370/5 |
| 5,646,941 A | 7/1997 | Nishimura et al. | 370/389 |
| 5,647,057 A | 7/1997 | Roden et al. | 395/275 |
| 5,652,584 A | 7/1997 | Yoon | 341/89 |
| 5,655,138 A | 8/1997 | Kikinis | 395/808 |
| 5,659,780 A | 8/1997 | Wu | 395/800.19 |
| 5,661,848 A | 8/1997 | Bonke et al. | 395/848 |
| 5,664,124 A | 9/1997 | Katz et al. | 395/309 |
| 5,668,948 A | 9/1997 | Belknap et al. | 395/200.61 |
| 5,671,441 A | 9/1997 | Glassen et al. | 395/828 |
| 5,684,954 A | 11/1997 | Kaiserswerth et al. | 395/200.2 |
| 5,687,174 A | 11/1997 | Edem et al. | 370/446 |
| 5,687,316 A | 11/1997 | Graziano et al. | 395/200.2 |
| 5,689,244 A | 11/1997 | Iijima et al. | 340/825.07 |
| 5,689,678 A | 11/1997 | Stallmo et al. | 395/441 |
| 5,689,727 A | 11/1997 | Bonke et al. | 395/840 |
| 5,691,994 A | 11/1997 | Acosta et al. | 371/40.1 |
| 5,692,211 A | 11/1997 | Gulick et al. | 395/800 |
| 5,696,924 A | 12/1997 | Robertson et al. | 395/412 |
| 5,699,503 A | 12/1997 | Bolosky et al. | 395/182.04 |
| 5,704,052 A | 12/1997 | Wu et al. | 395/380 |
| 5,706,439 A | 1/1998 | Paker | 395/200.17 |
| 5,708,779 A | 1/1998 | Graziano et al. | 395/200.8 |
| 5,710,773 A | 1/1998 | Shiga | 370/512 |
| 5,752,076 A | 5/1998 | Munson | 395/825 |
| 5,758,075 A | 5/1998 | Graziano et al. | 395/200.8 |
| 5,761,430 A | 6/1998 | Gross et al. | 395/200.55 |
| 5,761,457 A | 6/1998 | Gulick | 395/308 |
| 5,764,972 A | 6/1998 | Crouse et al. | 395/601 |
| 5,774,683 A | 6/1998 | Gulick | 395/309 |
| 5,781,599 A | 7/1998 | Shiga | 375/376 |
| 5,781,615 A | 7/1998 | Bales et al. | 379/899 |
| 5,787,256 A | 7/1998 | Marik et al. | 395/200.68 |
| 5,790,886 A | 8/1998 | Allen | 395/825 |
| 5,793,953 A | 8/1998 | Yeung et al. | 395/200.8 |
| 5,809,249 A | 9/1998 | Julyan | 395/200.53 |
| 5,812,883 A | 9/1998 | Rao | 395/8.94 |
| 5,815,678 A | 9/1998 | Hoffman et al. | 395/309 |
| 5,828,416 A | 10/1998 | Ryan | 348/512 |
| 5,828,903 A | 10/1998 | Sethuram et al. | 395/817 |
| 5,835,694 A | 11/1998 | Hodges | 385/182.04 |
| 5,835,726 A | 11/1998 | Shwed et al. | 709/229 |
| 5,835,793 A | 11/1998 | Li et al. | 395/898 |
| 5,848,253 A | 12/1998 | Walsh et al. | 395/309 |
| 5,884,103 A | 3/1999 | Terho et al. | 710/22 |
| 5,887,145 A | 3/1999 | Harari et al. | 395/282 |
| 5,893,148 A | 4/1999 | Genduso et al. | 711/132 |
| 5,928,331 A | 7/1999 | Bushmitch | 709/231 |
| 5,938,752 A | 8/1999 | Leung et al. | 710/126 |
| 5,946,298 A | 8/1999 | Okuyama | 370/232 |
| 5,960,036 A | 9/1999 | Johnson et al. | 375/219 |
| 5,960,152 A | 9/1999 | Sawabe et al. | 386/98 |
| 5,970,236 A | 10/1999 | Galloway et al. | 395/500 |
| 5,987,126 A | 11/1999 | Okuyama et al. | 380/5 |
| 5,991,520 A | 11/1999 | Smyers et al. | 395/280 |
| 6,012,117 A | 1/2000 | Traw et al. | 710/123 |
| 6,064,676 A | 5/2000 | Slattery et al. | 370/412 |
| 6,085,270 A | 7/2000 | Gulick | 710/100 |
| 6,145,039 A | 11/2000 | Ajanovic et al. | 710/105 |
| 6,233,637 B1 | 5/2001 | Smyers et al. | 710/129 |
| 6,243,778 B1 | 6/2001 | Fung et al. | 710/113 |
| 6,247,069 B1 * | 6/2001 | Smyers | 710/8 |
| 6,282,597 B1 | 8/2001 | Kawamura | 710/105 |
| 6,292,844 B1 | 9/2001 | Smyers et al. | 710/5 |
| 6,334,161 B1 | 12/2001 | Suzuki et al. | 710/29 |
| 6,374,314 B1 | 4/2002 | Darnell et al. | 710/52 |
| 6,374,317 B1 | 4/2002 | Ajanovic et al. | 710/105 |
| 6,438,604 B1 | 8/2002 | Kuver et al. | 709/234 |
| 6,859,846 B1 | 2/2005 | Swidler et al. | 710/8 |

FOREIGN PATENT DOCUMENTS

| | | |
|---|---|---|
| EP | 0 428 111 A2 | 5/1991 |
| EP | 0 499 394 A1 | 8/1992 |
| EP | 0 535 434 A2 | 4/1993 |
| EP | 0 588 046 A1 | 3/1994 |
| EP | 0 703 713 A2 | 1/1996 |
| EP | 0 696 853 A2 | 2/1996 |
| EP | 0 789 502 A2 | 8/1997 |
| EP | 0 860 823 A1 | 8/1998 |
| JP | 5-165687 | 7/1993 |
| JP | 411025596 A | 1/1999 |
| JP | 02000078428 A | 3/2000 |
| JP | 02000151681 A | 5/2000 |
| TW | 328997 | 4/1998 |
| WO | WO 97/33230 | 9/1997 |
| WO | WO 98 02881 | 1/1998 |
| WO | WO 98 47271 | 10/1998 |

OTHER PUBLICATIONS

"A Bus on a Diet-The Serial Bus Alternative" Michael Teener, CompCon92, Feb. 24-28, 1992, pp. 316-321.
"Local Area Network Protocol for Autonomous Control of Attached Devices" Software Patent Institute, 1995, 1996.
"Architecture for High Performance Transparent Bridges" Software Patent Institute, 1995, 1996.
"Access to High-Speed LAN via Wireless Media" Software Patent Institute, 1995, 1996.
"Asychronous Transfer Moded" Julia L. Heeter, Dec. 12, 1995.
"The SerialSoft IEEE 1394 Developer Tool" Skipstone.
"Data link driver program design for the IBM token ring network PC adapter", Gee-Swee Poo and Wilson Ang, Computer Communications, 1989, London, Great Britain, pp. 266-272.
"Fiber Channel (FCS)/ATM interworking: A design solution" A. Anzaloni, M. De Sanctis, F. Avaltroni, G. Rulli. L. Proietti and G. Lombardi, Ericsson Fatme R&D Division, Nov. 1993, pp. 1127-1133.
"Data Exchange Adapter for Micro Channel/370" Software Patent Institute, 1995, 1996.
American National Standards Institute X3T10 Technical Committee, *Information Technology—Serial Bus Protocol 2 (SBP-2)*, Project 1155D, Revision 1e, Nov. 9, 1996.
IEEE, "1394 Standard for a High Perfromance Serial Bus," 1995, USA.
"IEEE 1394, The Cable Connection to Complete the Digital Revolution," Daniel Moore.
"1394 200 Mb/s PHYsical Layer Transceiver," IBM Microelectronics, Product Data Sheet and Application Notes, Version 1.4, Mar. 14, 1996.
"IEEE 1394-1995 Triple Cable Transceiver/ Arbiter," Texas Instruments TSB21LV03, Product Preview, Revison0.99, Mar. 19, 1996.
"The IEEE-1394 High Speed Serial Bus." R.H.J. Bloks, Phillips Journal of Research, vol. 50, pp. 209-216, Jul. 1996.
Hoffman, et al., "IEEE 1394: A Ubiquitous Bus." Digest of Papers of the Computer Socity, Computer Conference (COMPCON) Technologies for the Information Superhighway, Mar. 5, 1999 pp. 334-338.

\* cited by examiner

AUTOMATICALLY CONFIGURING STORAGE ARRAY INCLUDING A PLURALITY OF MEDIA STORAGE DEVICES FOR STORING AND PROVIDING DATA WITHIN A NETWORK OF DEVICES

This is a divisional of U.S. patent application Ser. No. 09/861,825, filed May 21, 2001, now U.S. Pat. No. 6,993, 646, the contents of which are hereby incorporated by reference.

FIELD OF THE INVENTION

The present invention relates to the field of writing data to and reading data from media storage devices. More particularly, the present invention relates to the field of writing data to and reading data from media storage devices within a network of devices.

BACKGROUND OF THE INVENTION

The IEEE 1394-1995 standard, "1394 Standard For A High Performance Serial Bus," is an international standard for implementing an inexpensive high-speed serial bus architecture which supports both asynchronous and isochronous format data transfers. In addition, the IEEE 1394-1995 bus has a universal clock called the cycle timer. This clock is synchronized on all nodes. Isochronous data transfers are real-time transfers which take place based on the universal clock such that the time intervals between significant instances have the same duration at both the transmitting and receiving applications. Each packet of data transferred isochronously is transferred in its own time period. An example of an ideal application for the transfer of data isochronously would be from a video recorder to a television set. The video recorder records images and sounds and saves the data in discrete chunks or packets. The video recorder then transfers each packet, representing the image and sound recorded over a limited time period, during that time period, for display by the television set. The IEEE 1394-1995 standard bus architecture provides multiple independent channels for isochronous data transfer between applications. A six bit channel number is broadcast with the data to ensure reception by the appropriate application. This allows multiple applications to simultaneously transmit isochronous data across the bus structure. Asynchronous transfers are traditional reliable data transfer operations which take place as soon as arbitration is won and transfer a maximum amount of data from a source to a destination.

The IEEE 1394-1995 standard provides a high-speed serial bus for interconnecting digital devices thereby providing a universal I/O connection. The IEEE 1394-1995 standard defines a digital interface for the application thereby eliminating the need for an application to convert digital data to analog data before it is transmitted across the bus. Correspondingly, a receiving application will receive digital data from the bus, not analog data, and will therefore not be required to convert analog data to digital data. The cable required by the IEEE 1394-1995 standard is very thin in size compared to other bulkier cables used to connect such devices in other connection schemes. Devices can be added and removed from an IEEE 1394-1995 bus while the bus is operational. If a device is so added or removed the bus will then automatically reconfigure itself for transmitting data between the then existing nodes. A node is considered a logical entity with a unique address on the bus structure. Each node provides in a standard address space, an identification ROM, a standardized set of control registers and in addition, its own address space.

The IEEE 1394-1995 standard defines a protocol as illustrated in FIG. 1. This protocol includes a serial bus management block 10 coupled to a transaction layer 12, a link layer 14 and a physical layer 16. The physical layer 16 provides the electrical and mechanical connection between a device and the IEEE 1394-1995 cable. The physical layer 16 also provides arbitration to ensure that all devices coupled to the IEEE 1394-1995 bus have arbitrated access to the bus as well as actual data transmission and reception. The link layer 14 provides data packet delivery service for both asynchronous and isochronous data packet transport. This supports both asynchronous data transport, using an acknowledgement protocol, and isochronous data transport, providing an un-acknowledged real-time guaranteed bandwidth protocol for just-in-time data delivery. The transaction layer 12 supports the commands necessary to complete asynchronous data transfers, including read, write and lock. The serial bus management block 10 contains an isochronous resource manager for managing the resources associated with isochronous data transfers. The serial bus management block 10 also provides overall configuration control of the serial bus in the form of optimizing arbitration timing, guarantee of adequate electrical power for all devices on the bus, assignment of the cycle master, assignment of isochronous channel and bandwidth resources and basic notification of errors.

The AV/C Command Set is a command set used for transactions to and from consumer audio/video equipment over an IEEE 1394-1995 serial bus. This AV/C command set makes use of the Function Control Protocol (FCP) defined by IEC-61883, the ratified international standard for the transport of audio/video command requests and responses. AV/C commands are transmitted through AV/C transactions. An AV/C transaction consists of one AV/C command frame addressed to the target node's FCP_Command register and zero or more AV/C response frames addressed to the requesting node's FCP_Response register.

Each audio/video unit or subunit can implement a subset of the AV/C command set. An unsupported command received by an audio/video unit is rejected with a not implemented response. Support for the different commands is characterized as mandatory, recommended, optional and vendor-dependent. A mandatory command is supported by any audio/video device that claims compliance with the AV/C command set and that implements the audio/video unit or subunit type for which the command is defined. An AV/C compliant device is identified by an entry within its configuration read-only memory (ROM). A recommended command is optional for an AV/C compliant device, but represents a basic functionality, such as video and audio insert modes for a VCR subunit's record command. If the device supports a unit or subunit type that has the functionality corresponding to the command, it is recommended that the command be implemented. An optional command is optional for an AV/C compliant device. Support for and interpretation of a vendor-dependent command are defined by the device vendor.

AV/C commands are grouped into four command types including control, status, inquiry and notify command types. A control command is sent by a controller to another audio/video device, the target, to instruct the target to perform an operation. A target that receives a control command will return an AV/C response frame including either a not implemented, accepted, rejected or interim response code. The target will return a not implemented response code when the target does not support the control command specified or the command is addressed to a subunit not implemented by the target. The target will return an accepted response code when the target implements the control command specified and the current state of the target permits execution of the command. The target will return a rejected response code when the target implements the control command specified but the current state of the target does not permit execution of the command. The target will return an interim response code if the control command specified is implemented by the target, but the target is unable to respond with either an accepted or rejected response code within 100 milliseconds. Unless a subsequent bus reset causes the AV/C transaction to be aborted, the target will ultimately return a response frame with an accepted or rejected response code after returning an interim response code.

A status command is sent by a controller to an audio/video device to request the current status of the target device. Status commands may be sent to either audio/video units or subunits. A target that receives a status command will return an AV/C response frame including either a not implemented, rejected, in transition or stable response code. A target will return a not implemented status response code when the target does not support the status command specified or the command is addressed to a subunit not implemented by the target. A target will return a rejected status response code when the target implements the status command specified but the target state does not permit the return of status for the command. The target will return an in transition status response code when the target implements the status command specified, but the current state of the target is in transition. The target will return a stable status response code when the target implements the status command specified and the information requested is reported in the values in the AV/C response frame.

An inquiry command is used by a controller to determine whether or not a target audio/video device supports a particular control command. A controller can reliably use inquiry commands to probe the capabilities of a target, since the target shall not modify any state nor initiate any command execution in response to an inquiry command. A target that receives an inquiry command will return an AV/C response frame including either an implemented or a not implemented response code. An implemented response code notifies the controlling node that the corresponding control command specified is implemented by the target audio/video device. A not implemented response code notifies the controlling node that the corresponding control command specified is implemented by the target audio/video device.

A notify command is used by a controller to receive notification of future changes in an audio/video device's state. Responses to a notify command will indicate the current state of the target and then, at some indeterminate time in the future, indicate the changed state of the target. A target that receives a notify command will return an immediate response frame including either a not implemented, rejected or interim response code. A target will return a not implemented response code when the target does not support the notify command specified or the command is addressed to a subunit not implemented by the target. A target will return a rejected response code when the target implements event notification for the condition specified but is not able to supply the requested information. A target will return an interim response code when the target supports the requested event notification and has accepted the notify command for any future change of state. The current state is indicated by the data returned in the response frame. At a future time, the target will then return an AV/C response frame with either a rejected or changed response code.

A traditional hard disk drive records data and plays it back according to commands received from an external controller using a protocol such as the serial bus protocol (SBP). The external controller provides command data structures to the hard disk drive which inform the hard disk drive where on the media the data is to be written, in the case of a write application, or read from, in the case of a read operation.

Use of a media storage device, such as a hard disk drive, for storing streams of audio and video data is taught in U.S. patent application Ser. No. 09/022,926, filed on Feb. 12, 1998 and entitled "MEDIA STORAGE DEVICE WITH EMBEDDED DATA FILTER FOR DYNAMICALLY PROCESSING DATA DURING READ AND WRITE OPERATIONS," which is hereby incorporated by reference. When storing audio and video data streams on such a hard disk drive, the available capacity of the device can be quickly utilized, due to the large amounts of data included in typical audio and video data streams. If multiple traditional hard disk drives are utilized to store large streams of data, then the user must typically be responsible for management of these storage and retrieval procedures. This storage management responsibility adds complexity to operations such as record and playback and requires the user to monitor and control storage and retrieval operations.

SUMMARY OF THE INVENTION

An automatically configuring storage array includes a plurality of media storage devices coupled together within a network of devices. Preferably, the network of devices is an IEEE 1394-1995 serial bus network of devices. The media storage devices are utilized to record and retrieve streams of data transmitted within the network of devices. The media storage devices communicate with each other in order to store and retrieve streams of data over multiple media storage devices, if necessary. When a record or playback command is received by any one of the media storage devices, the media storage devices send control communications between themselves to ensure that the stream of data is recorded or transmitted, as appropriate. Control of the record or transmit operation is also transferred between the media storage devices in order to utilize the full capacity of the available media storage devices. Preferably, streams of data are recorded utilizing redundancy techniques. Object descriptors are stored within recorded streams of data to facilitate search and retrieval of the recorded streams of data throughout the media storage devices. Preferably, the media storage devices accept control instructions directly from devices within the network. Alternatively, a control device is utilized to provide a control interface between the media storage devices and the other devices within the network.

In one aspect of the invention, a method of recording data within an automatically configuring storage array including a plurality of media storage devices includes the steps of receiving a record command to record a stream of data at one of the media storage devices, determining a next available media storage device, recording the stream of data on media within the next available media storage device, thereby forming a recorded stream of data, recording an object descriptor including identifying and pointing information about the stream of data, sending control communications from the next available media storage device to other media storage devices within the automatically configuring storage array and repeating these steps when the next available media storage device does not have capacity to record remaining portions of the stream of data, until the stream of data is fully recorded. The control communications are sent to identify the next available media storage device when recording responsibility is transferred from a current recording media storage device to the next available media storage device. The record command is received from a remote controller. The object descriptor includes information about a source of the stream of data and the pointing information specifies locations of a previously recorded portion of the recorded stream of data and a subsequent recorded portion of the recorded stream of data. The stream of data is transmitted on a data isochronous channel. The control communications include a real time component transmitted on a control isochronous channel. The control communications include a non-real time component transmitted by asynchronous commands. The stream of data is preferably transmitted over an IEEE 1394 serial bus. The method further includes the step of recording redundant information regarding the stream of data which is used to reconstruct lost data within the recorded stream of data.

In another aspect of the present invention, a media storage device configured for coupling to other media storage devices to form an automatically configuring storage array, the media storage device includes an interface circuit for receiving control communications and a received stream of data to record and also for transmitting a recorded stream of data, a control circuit coupled to the interface circuit to control reception and recording of the received stream of data, thereby forming the recorded stream of data, and retrieval and transmittal of the recorded stream of data, wherein the control circuit receives and transmits control communications with remote media storage devices in the automatically configuring storage array in order to transfer control of recording and transmitting among the media storage devices within the automatically configuring storage array to record the received stream of data on one or more of the media storage devices and media coupled to the control circuit to record the recorded stream of data and to retrieve the recorded stream of data. The media storage device is also configured for coupling to a separate controller which initiates record and transmit operations involving the automatically configuring storage array. The media storage devices within the automatically configuring storage array are distributed devices and automatically configure themselves when recording the received stream of data, such that the recorded stream of data is recorded on more than one of the media storage devices if the recorded stream of data exceeds capacity of a first recording media storage device. Object descriptors are stored with the recorded stream of data and point to portions of the recorded stream of data which are stored on different media storage devices. The media storage device is a hard disk drive. The media storage device further includes a read/write channel circuit coupled to the control circuit and to the media for controlling record and retrieval operations from and to the media. The interface circuit is preferably coupled to an IEEE 1394 serial bus structure.

In yet another aspect of the present invention, an automatically configuring storage array within a network of devices including data source devices and data reception devices, the automatically configuring storage array including a plurality of distributed intelligent media storage devices including the ability to automatically configure themselves and record a received stream of data over multiple media storage devices, thereby forming a recorded stream of data. The recorded stream of data is recorded utilizing redundancy recording techniques. Object descriptors are stored with the recorded stream of data and point to portions of the recorded stream of data stored on different media storage devices. The automatically configuring storage array also includes a controller coupled to the media storage devices to initiate record and transmit operations. The media storage devices include one or more hard disk drives. The automatically configuring storage array is preferably formed within an IEEE 1394 serial bus network of devices.

In still another aspect of the present invention, an automatically configuring storage array within a network of devices including data source devices and data reception devices, the automatically configuring storage array including a plurality of media storage devices each having an interface circuit for receiving control communications and a received stream of data to record and also for transmitting a recorded stream of data, a control circuit coupled to the interface circuit to control reception and recording of the received stream of data, thereby forming the recorded stream of data, and retrieval and transmittal of the recorded stream of data, wherein the control circuit receives and transmits control communications with other media storage devices in order to transfer control of recording and transmitting among the media storage devices to record the received stream of data on one or more of the media storage devices and media coupled to the control circuit to record the recorded stream of data and to retrieve the recorded stream of data. The media storage device is also configured for coupling to a separate controller which initiates record and transmit operations involving the automatically configuring storage array. The recorded stream of data is recorded utilizing redundancy recording techniques. The media storage devices within the automatically configuring storage array are distributed devices and automatically configure themselves when recording the received stream of data, such that the recorded stream of data is recorded on more than one of the media storage devices if the recorded stream of data exceeds capacity of a first recording media storage device. Object descriptors are stored with the recorded stream of data and point to portions of the recorded stream of data which are stored on different media storage devices. The automatically configuring storage array further includes a read/write channel circuit coupled to the control circuit and to the media for controlling record and retrieval operations from and to the media. The media storage devices include one or more hard disk drive. The interface circuit is preferably coupled to an IEEE 1394 serial bus structure.

DETAILED DESCRIPTION OF THE PREFERRED EMBODIMENT

Figure 1:
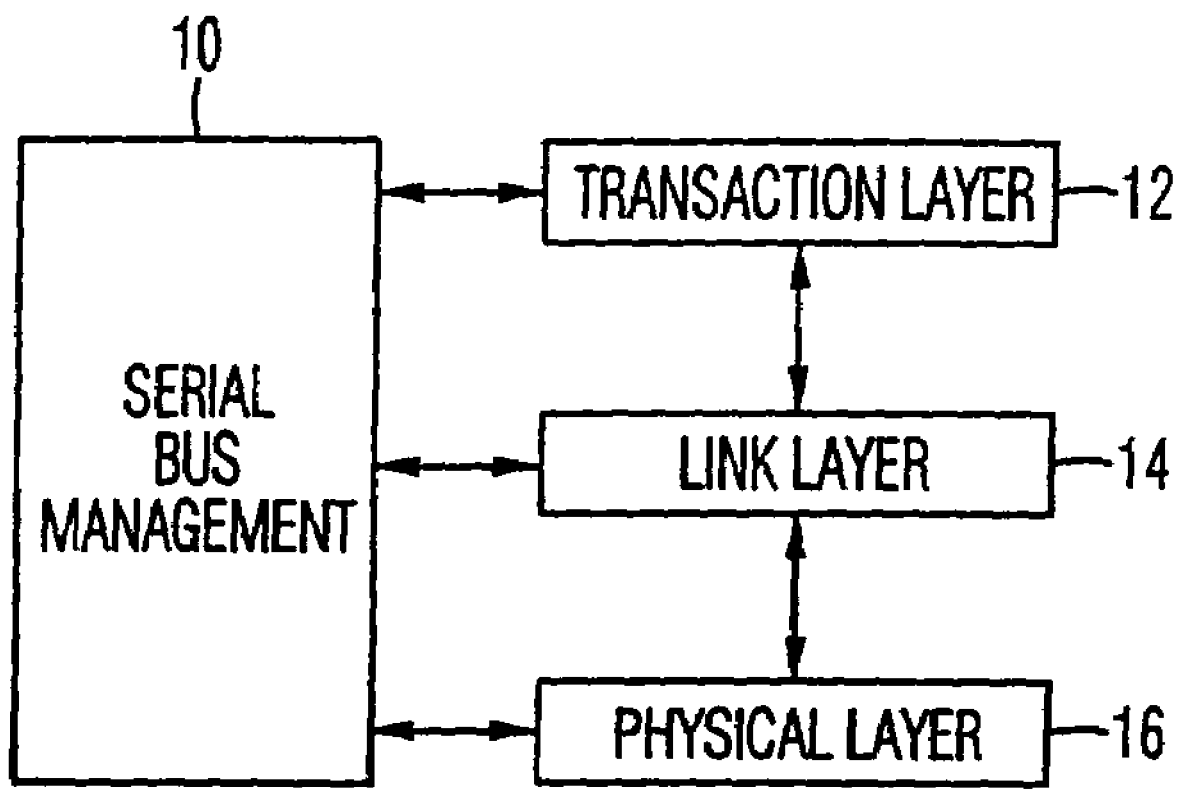
FIG. 1 illustrates a protocol defined by the IEEE 1394-1995 standard.

In a network of devices, including a plurality of media storage devices, the media storage devices operate together to form an automatically configuring storage array for storing and providing streams of data, such as audio and video data. The operation of the automatically configuring storage array of media storage devices is seamless and transparent to the user and to other devices within the network. When a record command is sent to any one of the media storage devices within the automatically configuring storage array, that media storage device will then determine the appropriate media storage device to begin recording the stream of data. The record command is forwarded to that device which will then begin recording the stream of data. When the capacity within the current recording media storage device is filled, the current recording media storage device will determine a next available media storage device and instruct that next available media storage device to begin recording the stream of data. This process continues until the stream of data is recorded and the source device ceases transmitting.

The stream of data is preferably transmitted from a source device on an isochronous channel over an IEEE 1394-1995 serial bus. Communications between the media storage devices are preferably sent on a separate isochronous communications channel over the IEEE 1394-1995 serial bus. Preferably, each of the media storage devices include an isochronous data pipe which controls data storage and retrieval operations, thereby transferring control and communications between the available media storage devices. Preferably, the media storage devices accept control instructions directly from other devices within the network. Alternatively, a separate control device within the network is utilized to provide a control interface between the media storage devices and the other devices within the network. Preferably, the media storage devices are hard disk drives. Alternatively, any appropriate available media storage device can be utilized within the automatically configuring array of devices.

When recording a stream of data, each of the recording media storage devices preferably use an embedded file system to facilitate subsequent retrieval and playback of the recorded stream of data. Utilizing this embedded file system, when recording starts at a media storage device, an object descriptor is generated. This object descriptor is stored on the media storage device and associated with the stream of data. The object descriptor includes information regarding where an earlier portion of the stream of data is recorded, if appropriate, and where a subsequent portion of the stream of data is recorded, if appropriate. Using these object descriptors, a search forward and backward through the recorded stream of data can be accomplished to find a specific location within the recorded stream of data. The object descriptors are also utilized during retrieval of the recorded stream of data to transfer control of the playback operation to the appropriate media storage devices which were used to record the stream of data.

Preferably, when recording a stream of data from a source device, redundancy techniques are utilized to ensure the integrity of the recorded stream of data. This redundancy is used to prevent the loss of data or facilitate the reconstruction of lost data if one of the media storage devices within the automatically configuring storage array is removed from the network of devices. If a media storage device is removed, then the remaining media storage devices will preferably automatically recreate the data that was stored on the removed media storage device.

Figure 2:
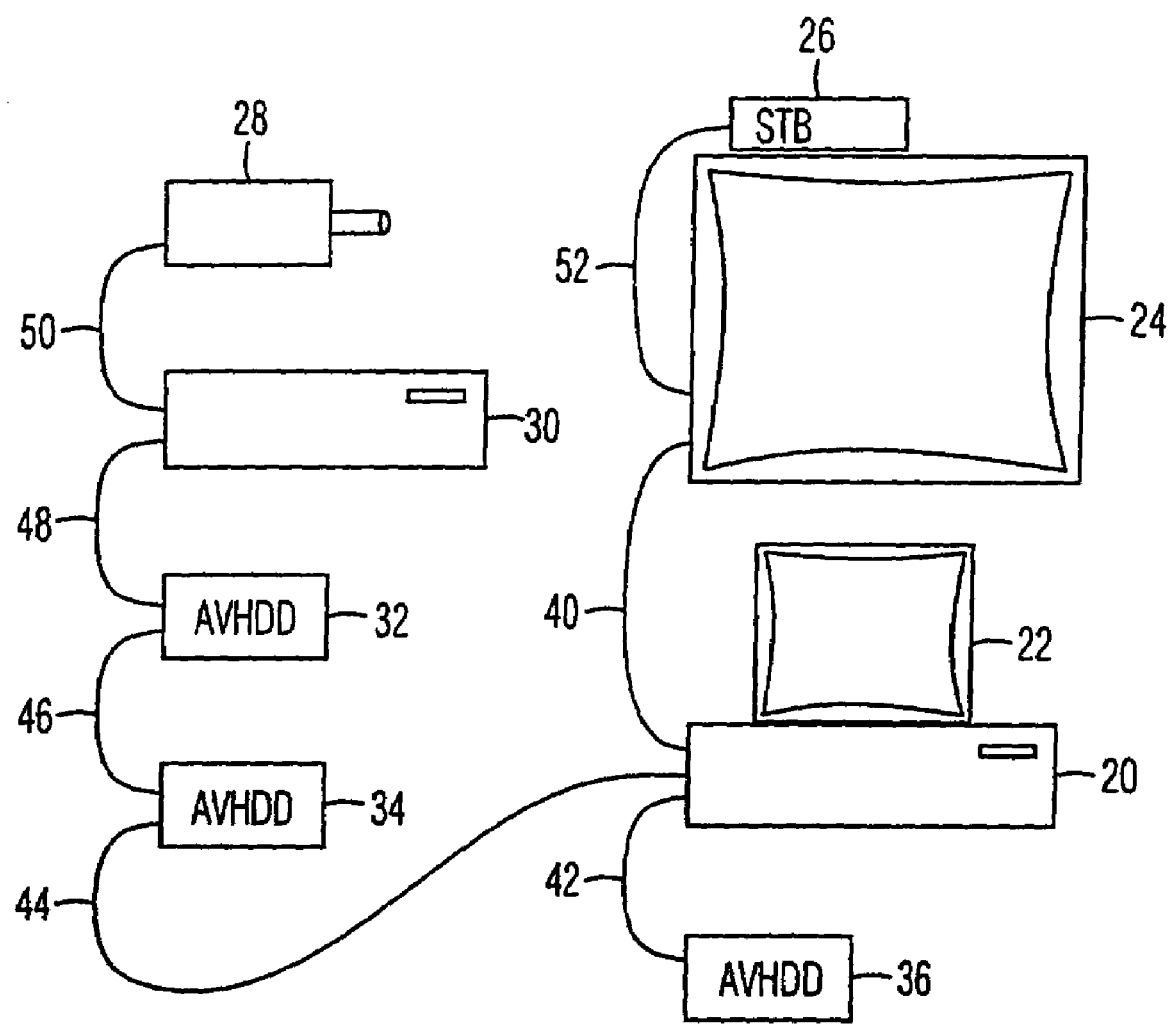
FIG. 2 illustrates an exemplary IEEE 1394-1995 serial bus network of devices including a video camera, a video cassette recorder, a settop box, a television, a computer and audio/video hard disk drives of the present invention.

FIG. 2 illustrates an exemplary network of devices including a video camera 28, a video cassette recorder (VCR) 30, a settop box 26, a television 24, a computer 20 and audio/video hard disk drives (AVHDD) 32, 34 and 36 connected together by IEEE 1394-1995 cables 40, 42, 44, 46, 48, 50 and 52. The IEEE 1394-1995 cable 50 couples the video camera 28 to the VCR 30, allowing the video camera 28 to send data, commands and parameters to the VCR 30 for recording. The IEEE 1394-1995 cable 48 couples the VCR 30 to the AVHDD 32. The IEEE 1394-1995 cable 46 couples the AVHDD 32 to the AVHDD 34. The IEEE 1394-1995 cable 44 couples the AVHDD 34 to the computer 20. The IEEE 1394-1995 cable 42 couples the computer 20 to the AVHDD 36. The IEEE 1394-1995 cable 40 couples the computer 20 to the television 24. The IEEE 1394-1995 cable 52 couples the television 24 to the settop box 26.

The configuration illustrated in FIG. 2 is exemplary only. It should be apparent that an audio/video network could include many different combinations of components. The devices within such an IEEE 1394-1995 network are autonomous devices, meaning that in an IEEE 1394-1995 network, as the one illustrated in FIG. 2, in which a computer is one of the devices, there is not a true "master-slave" relationship between the computer and the other devices. In many IEEE 1394-1995 network configurations, a computer may not be present. Even in such configurations, the devices within the network are fully capable of interacting with each other on a peer basis. It should be recognized that data, commands and parameters can be sent between all of the devices within the IEEE 1394-1995 network, as appropriate.

Figure 3:
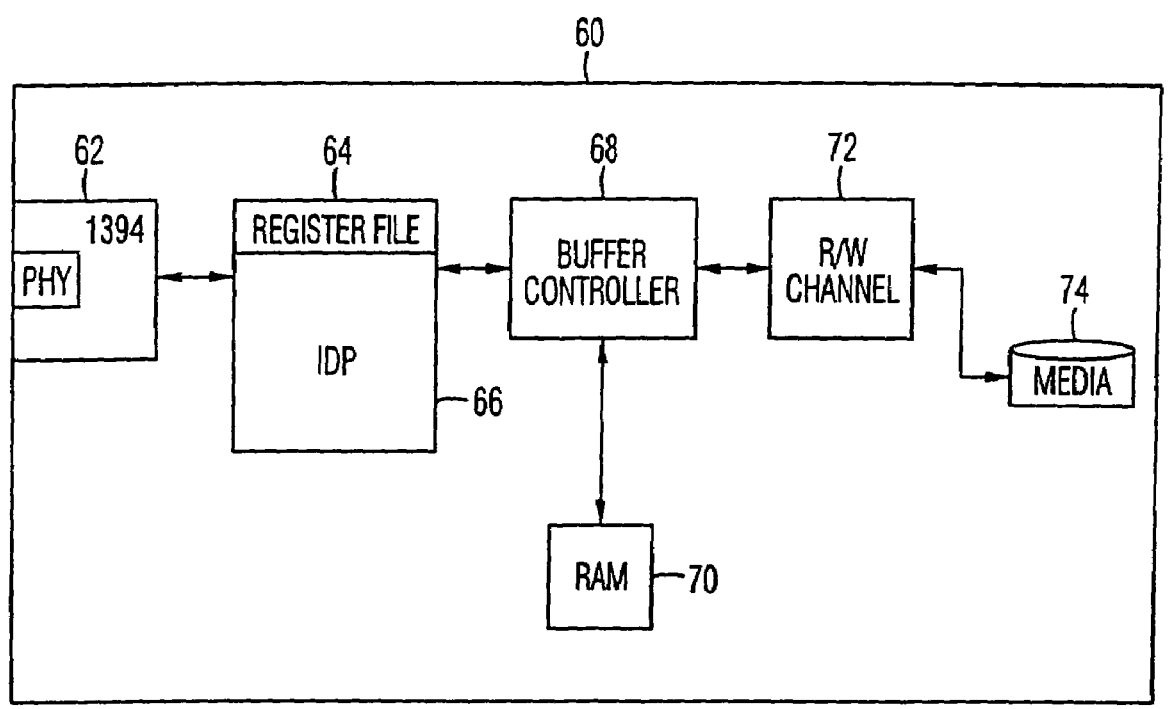
FIG. 3 illustrates a block diagram of a media storage device according to the preferred embodiment of the present invention.

A block diagram of a hardware system resident in each AVHDD of the preferred embodiment of the present invention is illustrated in FIG. 3. The AVHDD 60 preferably includes an IEEE 1394-1995 serial bus interface circuit 62 for sending communications to and receiving communications from other devices coupled to the IEEE 1394-1995 serial bus network. The interface circuit 62 is coupled to an isochronous data pipe 66. The isochronous data pipe 66 includes a register file 64. The isochronous data pipe 66 is coupled to a buffer controller 68. The buffer controller 68 is also coupled to a random access memory circuit 70 and to a read/write channel circuit 72. The read/write channel circuit 72 is coupled to media 74 on which data is stored within the AVHDD 60. The read/write channel circuit 72 controls the storage operations on the media 74, including reading data from the media 74 and writing data to the media 74.

Each of the AVHDDs 32, 34 and 36 follow protocols which are described herein and allow each of the AVHDDs 32, 34 and 36 to coordinate activities with each of the other AVHDDs so that the operation of the AVHDDs appears to a user and other components as a single media storage device. In the preferred embodiment of the present invention, the isochronous data pipe 66 within each of the AVHDDs 32, 34 and 36 in the network of devices control the storage operations of writing data to and reading data from the AVHDDs 32, 34 and 36. Alternatively, a separate controlling device is utilized to monitor and control the activities of the AVHDDs 32, 34 and 36. This controller can either be a device within the network, such as the computer 20 or the settop box 26, or a separate dedicated controller 80, as illustrated in FIG. 4.

Figure 4:
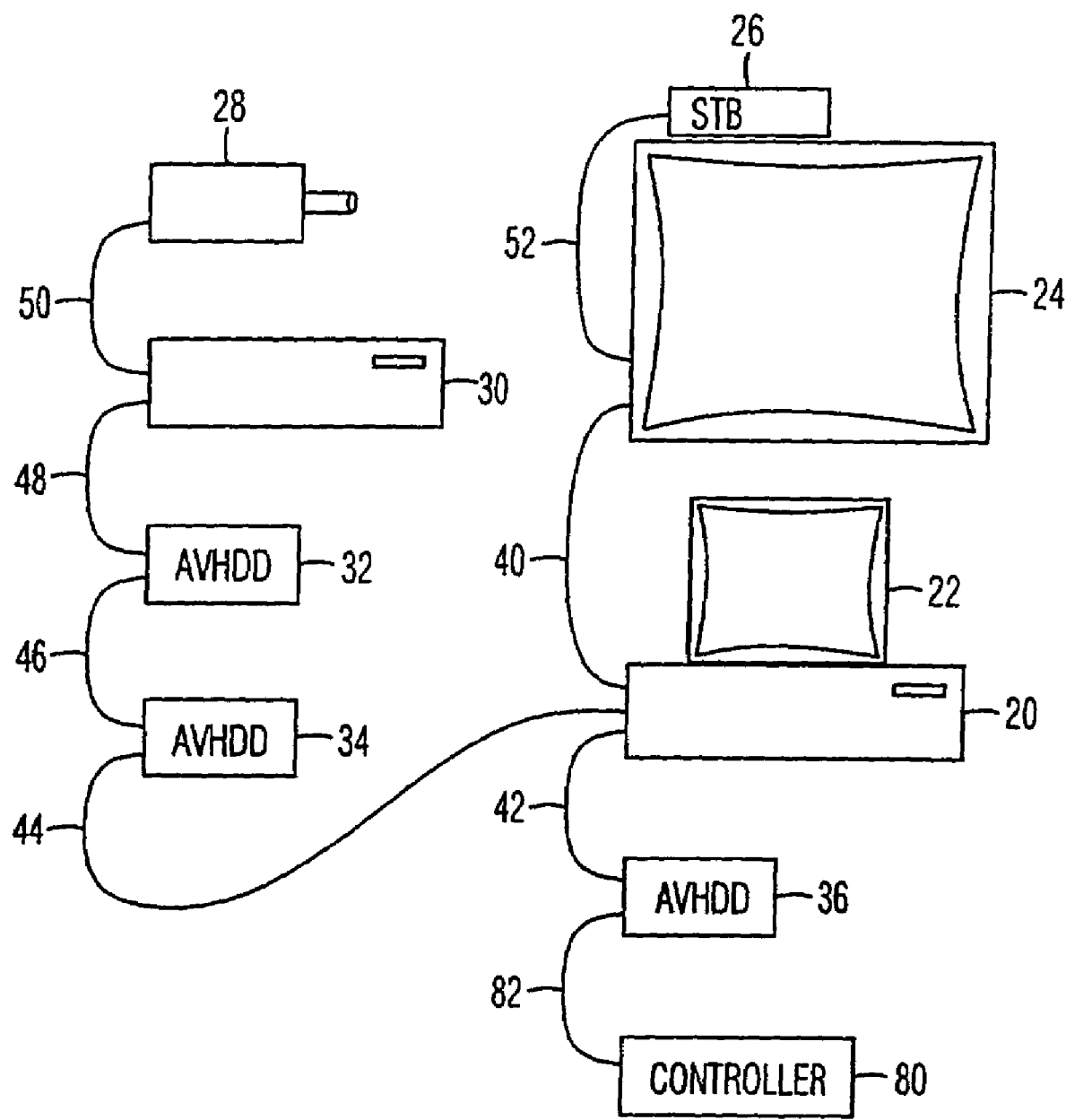
FIG. 4 illustrates an exemplary IEEE 1394-1995 serial bus network of devices including a separate dedicated storage array controller.

In the embodiment illustrated in FIG. 4, the controller 80 is coupled to the AVHDD 36 by the IEEE 1394-1995 cable 82. The controller 80 includes an appropriate user interface which enables a user to interact with the controller 80 and through the controller 80 control the interconnected components within the automatically configuring storage array. The controller 80 includes the ability to recognize and control the AVHDDs 32, 34 and 36, as well as sources of audio/video data such as the video camera 28, the VCR 30, the television 24, the settop box 26 and the computer system 20.

In the embodiment illustrated in FIG. 4, when the controller 80 receives an instruction to record an audio/video stream of data, the controller 80 initiates the recording process utilizing the AVHDDs 32, 34 and 36 available within the network of devices. After receiving an instruction to record an audio/video stream of data, the controller 80 locates the source of the data stream to be recorded, such as the settop box 26, and instructs it to begin transmitting the stream of data to be recorded on the IEEE 1394-1995 serial bus. The controller 80 obtains self describing information embedded within the source device over the IEEE 1394-1995 serial bus. The controller 80 utilizes the self describing information to locate the source device and learn how to control the source device. The controller 80 then utilizes the AV/C command set, appropriate for the source device, to control the source device. The stream of data is transmitted in a digital format over an isochronous channel on the IEEE 1394-1995 serial bus.

After receiving an instruction to record an audio/video stream of data, the controller 80 also locates one of the AVHDDs 32, 34 and 36 within the network, and instructs the selected one of the AVHDDs 32, 34 and 36 to begin recording the stream of data coming from the source device. The controller 80 obtains self describing information embedded within the selected AVHDD over the IEEE 1394-1995 serial bus. The controller 80 utilizes the self describing information to locate the selected AVHDD and learn how to control the selected AVHDD. In this embodiment, it does not matter which one of the AVHDDs 32, 34 and 36, the controller 80 selects and instructs to record.

When the selected AVHDD receives the record instruction from the controller 80, the selected AVHDD first determines which one of the available AVHDDs within the network should record the next stream of data. This determination is based on the available capacity of each of the available AVHDDs and the current responsibilities of those AVHDDs. Once the selected AVHDD determines which one of the available AVHDDs will record this stream of data, the selected AVHDD forwards the record command to that available AVHDD, which will be referred to herein as the recording AVHDD. The recording AVHDD then begins recording the stream of data from the source device. If the recording AVHDD runs out of available storage space while the source device is still transmitting the stream of data, the recording AVHDD, will locate the next available AVHDD within the network and forward the record command to that AVHDD. When forwarding the record command to the next available AVHDD, the recording AVHDD first establishes the precise time at which it will run out of available storage space and at which time the next available AVHDD must begin recording the stream of data. The transfer of recording responsibility is preferably accomplished without the loss of any data. If the controller 80 then sends a subsequent command to the selected AVHDD, the selected AVHDD will forward the command from the controller 80 to the current recording AVHDD.

The control communications between the AVHDDs 32, 34 and 36 include a real time component and a non-real time component. The non-real time component utilizes AV/C commands and is used to communicate such commands as record and play. This non-real time component is sent using asynchronous transactions over the IEEE 1394-1995 serial bus. The real time communications component is sent over the IEEE 1394-1995 serial bus on an isochronous communications channel and utilizes the isochronous data pipe 66 within the AVHDDs 32, 34 and 36. This real time communications component is sent on an isochronous channel which is different than the isochronous channel on which the stream of data is transmitted. The currently recording AVHDD continuously sends information over this isochronous communications channel about itself. One isochronous cycle before the time of the transition from the currently recording AVHDD to the next available AVHDD, the currently recording AVHDD changes the information transmitted on the isochronous communications channel to provide that the next available AVHDD is the current recording AVHDD. In response, the next available AVHDD then begins recording the stream of data on the next isochronous cycle.

Once the next available AVHDD begins recording the stream of data, it utilizes the non-real time communications component to inform the prior recording AVHDD that it is successfully recording the stream of data. In response to this acknowledgement, the prior recording AVHDD stops transmitting control data on the isochronous communications channel. When the next available AVHDD recognizes that no control data is available on the isochronous communications channel, it begins transmitting control data on the isochronous communications channel as the current recording AVHDD. Alternatively, the real-time communications component is realized using scheduling algorithms, as is well known in the art, which rely on recognizing the transition from one recording AVHDD to the next AVHDD by watching the IEEE 1394-1995 bus time.

In this alternate embodiment, the controller 80 can be implemented as a separate device, as shown in FIG. 4, or a capable device within the network, such as the settop box 26 or the computer 20, can serve as the controller and be used to control the operation of the AVHDDs 32, 34 and 36, within the network of devices.

In the preferred embodiment of the present invention, the isochronous data pipes 66 within the AVHDDs 32, 34 and 36 in the network can receive instructions directly from devices within the network and are utilized to initiate and control the operation of the AVHDDs 32, 34 and 36 during recording of a stream of data. When the user desires to begin recording a stream of data, the user enters a record command from any appropriate interface device within the network, specifying the source device and the particular stream of data to be recorded. The record command is then transmitted to any one of the AVHDDs 32, 34 and 36 within the network. The AVHDD which receives the record command then locates the source of the data stream to be recorded and instructs this source device to begin transmitting the stream of data on the IEEE 1394-1995 serial bus. The AVHDD also obtains self describing information embedded within the source device over the IEEE 1394-1995 serial bus. The AVHDD utilizes the self describing information to locate the source device and learn how to control the source device. The AVHDD utilizes the AV/C command set appropriate for the source device to control the source device. The stream of data is transmitted in a digital format over an isochronous channel on the IEEE 1394-1995 serial bus.

After receiving an instruction to record an audio/video stream of data, the receiving AVHDD then determines the next available AVHDD and forwards the record command to that next available AVHDD. The next available AVHDD then begins recording the stream of data from the source device and will, if necessary, transfer control of recording to the next available AVHDD, as described above.

When a stream of data is being recorded by a current recording AVHDD, the isochronous data pipe 66 within that current recording AVHDD controls the reception of the stream of data from the IEEE 1394-1995 serial bus and the transfer of that stream of data through the read/write channel 72 and onto the media 74. If the stream of data will exceed the available capacity of the AVHDD, then the AVHDD determines when the media 74 within the AVHDD will be filled, and then utilizes the isochronous data pipe 66 to control the transfer of control to the next available AVHDD. When transferring control from one AVHDD to another, the current AVHDD contacts the next available AVHDD utilizing the non-real time communications component and the real time communications component, as described above, to inform the next available AVHDD when it will need to begin recording the data stream. The next available AVHDD will then begin recording the data stream at the appropriate time.

When recording a stream of data, each of the AVHDDs preferably use an embedded file system and object descriptors to serve as pointers and connect a stream of data recorded over multiple AVHDDs. The embedded file system and object descriptors are used during subsequent retrieval and playback of the recorded stream of data. When recording starts at an AVHDD, an object descriptor is generated by the recording AVHDD. The object descriptor is stored on the media storage device and associated with the stream of data. The object descriptor includes information about the recorded stream of data, including the device from which recording control was transferred, if appropriate, and to which device recording control was transferred, if appropriate. The object descriptors form a list or map of a data stream recorded over multiple AVHDDs.

Using the object descriptors stored with the data, a search forward and backward through the recorded stream of data can be accomplished to find a specific location within the recorded stream of data. The object descriptors are also utilized during retrieval of the recorded stream of data to transfer control of the playback operation to the appropriate AVHDDs on which the stream of data is recorded. During a playback operation, the data is initially retrieved from the desired starting point within the recorded stream of data and transmitted by the appropriate AVHDD to the requesting device over the IEEE 1394-1995 serial bus. When the ending point of the recorded stream of data on the current AVHDD is reached, the buffer controller 68 within that AVHDD reads the appropriate object descriptor to determine the AVHDD, within the network, on which the next portion of the stream of data is recorded. Once the next AVHDD is identified, the buffer controller 68 performs the non-real time communications and the isochronous data pipe 66 performs the real time communications, as described above, to that next AVHDD, in order to ensure a seamless transition to the next AVHDD. In this same manner, rewind and fast-forward capabilities are also achieved, by following the object descriptors through the recorded stream of data.

Preferably, the isochronous data pipe 66 in each of the AVHDDs is utilized to control record and retrieval operations, as well as communicate with the other AVHDDs within the automatically configuring storage array of AVHDDs. The preferred embodiment of the isochronous data pipe 66 is taught in U.S. patent application Ser. No. 08/612, 322, filed on Mar. 7, 1996 and entitled "ISOCHRONOUS DATA PIPE FOR MANAGING AND MANIPULATING A HIGH-SPEED STREAM OF ISOCHRONOUS DATA FLOWING BETWEEN AN APPLICATION AND A BUS STRUCTURE," which is hereby incorporated by reference. The isochronous data pipe 66 is programmable and will execute a series of instructions on a stream of data in order to perform operations and manipulations on the data as required to place the data in the appropriate format.

In the preferred embodiment of the present invention, when a stream of data is recorded within the automatically configuring storage array, the stream of data is recorded using a level of redundancy in order to ensure the integrity of the recorded data and prevent any loss of data. This redundancy is used to prevent the loss of data and facilitate the reconstruction of lost data when one of the AVHDDs within the automatically configuring storage array of the present invention is removed from the network of devices or otherwise becomes unavailable. Using a redundancy technique, if a media storage device is removed, then the remaining AVHDDs will preferably automatically recreate and record the data that was stored on the removed AVHDD.

Any available redundancy techniques can be used to store a stream of data within the automatically configuring storage array of the present invention. In such redundancy techniques, data or relationships among data, are stored in multiple locations. In one such technique, data is mirrored or duplicated and stored in two separate areas of the storage array. Using a mirror technique, two separate copies of the data are stored in different locations within the automatically configuring storage array. This method has the disadvantage of requiring more storage capacity within the array, but there is a high probability of recreating any lost data.

Using a parity redundant technique, a portion of the memory storage array is dedicated to storing redundant data. The size of this redundant portion is less than the remaining space within the array used to store the actual data. In an array including five AVHDDs, one of the AVHDDs could be dedicated as the parity AVHDD. This method requires less capacity than the mirror technique, but also has a lower probability of recreating any lost data.

Preferably, some level of redundancy techniques are used to record data within the automatically configuring storage array of the present invention. Such techniques are generally referred to as redundant array of independent disks (RAID) techniques. The term RAID means a disk array in which part of the physical storage capacity is used to store redundant information about data stored on the remainder of the storage capacity. This redundant information enables regeneration of user data in the event that one of the AVHDDs within the array is removed or fails. A detailed discussion of RAID systems is found in a book entitled "The RAIDBook: Sixth Edition," published by the RAID Advisory Board, North Grafton, Mass.

In operation, when a user wants a particular stream of data recorded, the user will program an instruction to record a particular stream of data beginning immediately, or at some specified later date. For example, a user could program an instruction to record channel 10 from the settop box 26 between 7:00 PM and 8:00 PM. In the alternate embodiment, a record command is generated and transmitted to the controller 80 corresponding to the programmed instruction. The controller 80 then forwards the record command to one of the AVHDDs 32, 34 and 36. In the preferred embodiment, the corresponding record command is transmitted directly to one of the AVHDDs 32, 34 and 36. Once the record command is received by one of the AVHDDs 32, 34 and 36, that AVHDD then determines which one of the available AVHDDs 32, 34 and 36 should begin recording the stream of data. The record command is then forwarded, if appropriate, to the recording AVHDD. An instruction is also sent to the settop box 26, to instruct it that it should transmit channel 10 between 7:00 PM and 8:00 PM over the IEEE 1394-1995 serial bus. An isochronous channel is used to transmit the source stream of data over the IEEE 1394-1995 serial bus from the settop box 26 to the recording AVHDD.

The recording AVHDD begins recording the stream of data from the settop box 26. At the beginning of the recorded stream of data, an object descriptor is recorded specifying that this is the beginning of the recorded stream of data and from where the recorded stream of data is received. The recording AVHDD also begins transmitting control data over the isochronous communications channel concerning itself and the recorded stream of data. If the recording AVHDD does not have enough capacity to record the entire stream of data from the settop box 26, then one isochronous cycle before the necessary time of transition, the currently recording AVHDD changes the information transmitted on the isochronous communications channel to provide that the next available AVHDD is the current recording AVHDD. In response to this communications information, the next available AVHDD begins recording the stream of data on the next isochronous cycle. At the beginning of this recorded portion of the stream of data, the next available AVHDD records an object descriptor specifying the source of the stream of data and from which AVHDD control of the recording was transferred.

Once the next available AVHDD begins recording the stream of data, it utilizes the non-real time communications component to inform the prior recording AVHDD that it is successfully recording the stream of data. In response to this acknowledgement, the prior recording AVHDD stops transmitting control data on the isochronous communications channel. The next available AVHDD recognizes that no control data is available on the isochronous communications channel and begins transmitting control data on the isochronous communications channel as the current recording AVHDD. This process is continued until the entire data stream of the transmission of channel 10 between 7:00 PM and 8:00 PM from the settop box 26 is recorded.

When the user than wants to view the recorded stream of data, a playback command is sent to the controller 80 in the alternate embodiment or to one of the AVHDDs 32, 34 and 36, directly, in the preferred embodiment. Once the retrieval command is received by one of the AVHDDs 32, 34 and 36, the beginning of the stream of data is located using the object descriptors stored with the stream of data which serve as forward and backward pointers. Once the AVHDD on which the beginning of the stream of data is located, that AVHDD then begins transmitting the recorded stream of data over an isochronous channel on the IEEE 1394-1995 serial bus to a specified display device, such as the television 24. Control is transferred between the AVHDDs, as specified by the object descriptors, in order to transmit the recorded stream of data. Fast forward and rewind functions, through the recorded stream of data, are also achieved using the object descriptors stored within the recorded stream of data.

The automatically configuring storage array of the present invention includes a plurality of AVHDDs or other media storage devices on which data can be recorded. The media storage devices communicate with each other in order to store and retrieve streams of data over multiple media storage devices, if necessary. To the user and to the other devices within the network, the automatically configuring storage array appears to be a single media storage device. Accordingly, when a record or playback command is received by any one of the media storage devices, the media storage devices send control communications between themselves to ensure that the stream of data is recorded or transmitted, as appropriate. Control of the record or transmit operation is also transferred between the media storage devices in order to utilize the full capacity of the available media storage devices within the automatically configuring storage array. Preferably, streams of data are also recorded utilizing redundancy techniques in order to prevent the loss of any recorded data. Object descriptors are also stored with recorded streams of data in order to facilitate search and retrieval of the recorded streams of data throughout the media storage devices within the automatically configuring storage array.

The present invention has been described in terms of specific embodiments incorporating details to facilitate the understanding of principles of construction and operation of the invention. Such reference herein to specific embodiments and details thereof is not intended to limit the scope of the claims appended hereto. It will be apparent to those skilled in the art that modifications may be made in the embodiment chosen for illustration without departing from the spirit and scope of the invention. Specifically, it will be apparent to those skilled in the art that while the preferred embodiment of the present invention is used with an IEEE 1394-1995 serial bus structure, the present invention could also be implemented on any other appropriate bus structures. Additionally, it will also be apparent that while the preferred embodiment of the present invention includes AVHDDs within the automatically configuring storage array, any other appropriate media storage device can also be used.

I claim:

1. A method of recording data within an automatically configuring storage array including a plurality of media storage devices comprising:
   a. receiving a record command to record a stream of data at one of the media storage devices;
   b. determining a next available media storage device, wherein the media storage devices determine the next available media storage device after the record command is received;
   c. recording the stream of data on media within the next available media storage device, thereby forming a recorded stream of data;
   d. recording an object descriptor including identifying and pointing information about the stream of data;
   e. sending control communications from the next available media storage device to other media storage devices within the automatically configuring storage array; and
   f. repeating determining a next available media storage device, recording the stream of data on media, recording an object descriptor and sending control communications from the next available media storage device when the next available media storage device does not have capacity to record remaining portions of the stream of data, until the stream of data is fully recorded.

2. The method as claimed in claim 1 wherein control communications are sent to identify the next available media storage device when recording responsibility is transferred from a current recording media storage device to the next available media storage device.

3. The method as claimed in claim 1 wherein the record command is received from a remote controller.

4. The method as claimed in claim 1 wherein the object descriptor includes information about a source of the stream of data and the pointing information specifies locations of a previously recorded portion of the recorded stream of data and a subsequent recorded portion of the recorded stream of data.

5. The method as claimed in claim 1 wherein the stream of data is transmitted on a data isochronous channel.

6. The method as claimed in claim 5 wherein the control communications include a real time component transmitted on a control isochronous channel.

7. The method as claimed in claim 6 wherein the control communications include a non-real time component transmitted by asynchronous commands.

8. The method as claimed in claim 7 wherein the stream of data is transmitted over an IEEE 1394 serial bus.

9. The method as claimed in claim 1 further comprising recording redundant information regarding the stream of data which is used to reconstruct lost data within the recorded stream of data.

10. A method of recording data within an automatically configuring storage array including a plurality of media storage devices comprising:
   a. receiving a record command to record a stream of data at one of the media storage devices;
   b. determining a next available media storage device;
   c. recording the stream of data on media within the next available media storage device, thereby forming a recorded stream of data;
   d. recording an object descriptor including identifying and pointing information about the stream of data, wherein the pointing information specifies locations of a previously recorded portion of the recorded stream of data and a subsequent recorded portion of the recorded stream of data;
   e. sending control communications from the next available media storage device to other media storage devices within the automatically configuring storage array; and
   f. repeating determining a next available media storage device, recording the stream of data on media, recording an object descriptor and sending control communications from the next available media storage when the next available media storage device does not have capacity to record remaining portions of the stream of data, until the stream of data is fully recorded.

11. The method as claimed in claim 10 wherein control communications are sent to identify the next available media storage device when recording responsibility is transferred from a current recording media storage device to the next available media storage device.

12. The method as claimed in claim 10 wherein the record command is received from a remote controller.

13. The method as claimed in claim 10 wherein the object descriptor comprises information about a source of the stream of data.

14. The method as claimed in claim 10 wherein the stream of data is transmitted on a data isochronous channel.

15. The method as claimed in claim 14 wherein the control communications include a real time component transmitted on a control isochronous channel.

16. The method as claimed in claim 15 wherein the control communications include a non-real time component transmitted by asynchronous commands.

17. The method as claimed in claim 16 wherein the stream of data is transmitted over an IEEE 1394 serial bus.

18. The method as claimed in claim 10 further comprising recording redundant information regarding the stream of data which is used to reconstruct lost data within the recorded stream of data.

19. A method of recording data within an automatically configuring storage array including a plurality of media storage devices comprising:
   a. receiving a record command to record a stream of data at one of the media storage devices;
   b. determining a next available media storage device, wherein the media storage devices determine the next available media storage device after the record command is received;
   c. recording the stream of data on media within the next available media storage device, thereby forming a recorded stream of data;
   d. recording an object descriptor including identifying and pointing information about the stream of data, wherein the pointing information specifies locations of a previously recorded portion of the recorded stream of data and a subsequent recorded portion of the recorded stream of data;
   e. sending control communications from the next available media storage device to other media storage devices within the automatically configuring storage array, wherein control communications are sent to identify the next available media storage device when recording responsibility is transferred from a current recording media storage device to the next available media storage device;
   f. repeating determining a next available media storage device, recording the stream of data on media, recording an object descriptor and sending control communications from the next available media storage when the next available media storage device does not have capacity to record remaining portions of the stream of data, until the stream of data is fully recorded; and
   g. recording redundant information regarding the stream of data which is used to reconstruct lost data within the recorded stream of data.

20. The method as claimed in claim 19 wherein the record command is received from a remote controller.

21. The method as claimed in claim 19 wherein the object descriptor comprises information about a source of the stream of data.

22. The method as claimed in claim 19 wherein the stream of data is transmitted on a data isochronous channel.

23. The method as claimed in claim 22 wherein the control communications include a real time component transmitted on a control isochronous channel.

24. The method as claimed in claim 23 wherein the control communications include a non-real time component transmitted by asynchronous commands.

25. The method as claimed in claim 24 wherein the stream of data is transmitted over an IEEE 1394 serial bus.

* * * * *